United States Patent
Weininger

[11] 3,797,948
[45] Mar. 19, 1974

[54] FASTENING MEANS FOR TUBULAR MEMBERS

[76] Inventor: Edwin Charles Weininger, 1508 Wendover Dr., High Point, N.C. 27262

[22] Filed: Aug. 28, 1972

[21] Appl. No.: 284,278

[52] U.S. Cl................ 403/245, 403/187, 403/354
[51] Int. Cl............................................ F16b 7/18
[58] Field of Search............287/54 A, 54 B, 54 C, 287/189.36 H, 189.36 R, 103 A; 403/187, 189, 192, 354, 245, 289, 290, 280

[56] References Cited
UNITED STATES PATENTS

| | | | |
|---|---|---|---|
| 3,561,801 | 2/1971 | Chiu | 287/54 C |
| 3,606,408 | 9/1971 | Wagner | 287/54 B |
| 3,423,781 | 1/1969 | Henson | 287/103 A |
| 3,144,265 | 8/1964 | Humble | 287/54 B |
| 3,392,947 | 7/1968 | Keliehor | 287/54 A |
| 3,485,519 | 12/1969 | Chiu | 287/54 C |

*Primary Examiner*—Reinaldo P. Machado
*Attorney, Agent, or Firm*—Hugh C. Bennett, Jr.

[57] ABSTRACT

A channel-shaped member is attached at one end to a tubular member so that the channel may be axially inserted into another tubular member, thereby forming a construction unit for knock-down furniture supports. A longitudinally extending slot is provided in the channel-shaped member's web portion, extending through the web's outer edge and terminating short of its inner edge. When a spreading element such as a self-tapping screw is inserted into the longitudinally extending slot at any point along the longitudinal axis thereof, the channel member's spaced-apart walls are forced away from each other due to the weakening effect of the slot in the channel's web portion. Accordingly, the channel's spaced-apart walls make frictional engagement with the other tubular member's inner walls. A locking means associated with the other tubular member interlocks with the self-tapping screw. The other tubular member may be provided also with a longitudinal slot, extending from the outer edge thereof to and connecting with the locking means, which slot corresponds with the longitudinal slot provided in the channel-shaped member. As a result, the self-tapping screw may be prepositioned in place at the manufacturing location with field assembly consisting of merely sliding the other tubular member into place and tightening the screw.

6 Claims, 8 Drawing Figures

PATENTED MAR 19 1974  3,797,948

FASTENING MEANS FOR TUBULAR MEMBERS

BACKGROUND OF THE INVENTION

This invention relates to metallic building joints for connecting two or more tubular members and more particularly to connectors of the knock-down type for furniture supports.

Illustrative of the various known connectors of the type in question are those disclosed in U. S. Pat. Nos. 2,996,159; 3,606,408; and 3,561,801. The known connectors, however, are not entirely satisfactory in all respects. Some depend upon an interlocking means to hold the various parts in proper assembly; however, such joints, generally, are characterized by a tendency to have some looseness or play in them, causing them to "rattle," and resulting in an unstable, wobbly assembly. Other connectors utilize a frictional means for holding the parts together, which results in an assembly having satisfactory initial tightness but one that, in time, will tend to become loose and slip apart, particularly when the frictional contact relates only to a small area between the respective elements of the connector assembly. More recently developed connectors of the type in question, generally, have a connector insert member attached by some means to one tubular member. Another tubular member is axially positioned thereover and a fastener element, inserted through an opening provided in the other tubular member, causes the connector insert member to assume frictional engagement with the interior of said other tubular member. In some instances, the fastener elements serves also to interlock the tubular members together. A common and substantially serious deficiency with connectors of this type is that most, if not all, require a very precise positioning of the opening in the other tubular member's wall through which the fastener element passes so that proper contact with the connector insert member can be made. Improper positioning of the opening will result in a number of possible defects, including inability to field-assemble the connector, existence of an undesirable space between the assembled parts causing the joint to have an unsatisfactory appearance for finished furniture use, and a generally loose connection with the attendant wobble and rattle which is equally unsatisfactory for finished furniture use. Another serious and common deficiency of the connectors of this type is their complicated structure and fabrication requirements leading both to higher cost of manufacturer and difficulty of use, particularly in field-assembly and-disassembly.

SUMMARY OF THE INVENTION

With the foregoing in mind, the present invention provides an improved connector for knock-down furniture supports, which connector is of a simple and durable construction; which may be quickly and easily manufactured, assembled and disassembled, particularly field-assembled and -disassembled; which forms a reliable, secure joint without the appearance of spaces or gaps around the edges thereof and without wobble or rattle; which uses a combination of interlocking and frictional means to hold the various parts in proper assembly; and which does not rely upon a precise alignment or interconnection of corresponding parts for the formation of a tight, satisfactory appearing joint.

In a preferred embodiment of the invention, the fastening means of a connector for knock-down furniture supports, as contemplated herein, includes a connector-insert element attached at one end thereof to a tubular member intended for joining with another tubular member. The connector-insert element is in the shape of a channel and has a weakening means in its web portion, which weakening means includes a longitudinally extending slot extending through the outer edge of said web portion and terminating short of the inner edge thereof, which slot has substantially a uniform width along its longitudinal axis. The connector-insert element is inserted axially into the other tubular member. A spreading member, such as a self-tapping fastener element or the like, is inserted into the longitudinally extending slot in the channel's web portion, at any point along the longitudinal axis of said slot, to spread the channel's parallel, spaced apart wall portions so that the outer surface of said wall portion makes frictional contact with the inner surface of the other tubular member along, substantially, the full longitudinal axis of said wall portion's outer surface, producing, thereby, a reliable friction-type connection. An opening is provided through the wall of the other tubular member and positioned therein to overlay the longitudinally extending slot in the connector-insert element at a point substantially adjacent to the inner limit thereof when the connector-insert element is inserted axially into the other tubular member. The spreading member is inserted through the opening described in the preceding sentence and into the longitudinally extending slot, and while spreading the channel's wall portions apart the spreading member acts also as a locking member by interlocking with the aforementioned opening. By providing a slot in the other tubular member's wall, extending from the outer edge thereof to and connecting with the spreading-lockng-member-receiving opening therein, fabrication of the assembly can include pre-starting of the spreading-locking element into the web's weakening slot. Field assembly becomes a simple operation of slipping the other tubular member into place over the connector-insert element. The slot in the other tubular member makes this possible when the spreading-locking element is already in place. To complete the asembly, the spreading-locking element is tightened into simultaneous spreading engagement with the connector insert element and locking engagement with the opening provided in the other tubular member. Tightening is accomplished by a simple hand tool, which can be an ordinary coin of small denomination or some other similarly shaped object.

DESCRIPTION OF THE DRAWINGS

Other features and advantages of the invention will be in part apparent and in part pointed out hereafter in the following description of an illustrative embodiment thereof, which should be read in conjunction with the accompanying drawing, in which.

DESCRIPTION OF THE PREFERRED EMBODIMENT

Figures 1, 2:
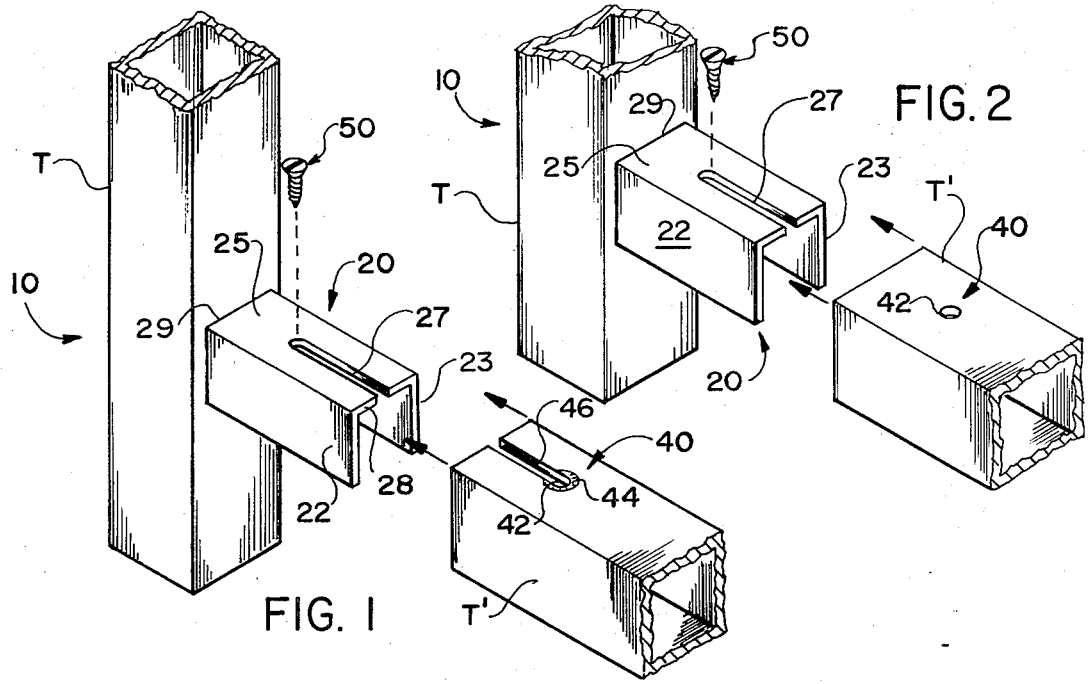
FIG. 1 is a perspective, exploded view of the fastening means in accordance with the present invention.
FIG. 2 illustrates the fastening means of FIG. 1 in slightly modified form.

A fastening means 10 shown in FIG. 1 is used to connect tubular members, such as the sections of square tubing T, T', forming, thereby, a knock-down joint construction for furniture supports, modular display units and the like. The fastening means 10 includes a connector insert element 20, attached at one end 29 to the surface of the square tubing T and adapted for axial insertion thereof into the other square tubing T'. A locking means 40, associated with the square tubing T', interlocks with a spreading-locking element 50, to be described later, and securely locks the square tubing T, T' into a structural knockdown connection unit.

To those skilled in the art, it will be obvious, of course, that tubing of substantially any shape and size, including round tubing, may be connected by the fastening means described herein, and, while standard 1-inch square aluminum tubing having a 1/8-inch wall is used in the example described herein, practice of the invention is not limited thereto.

The connector insert element 20 includes a pair of parallel, spaced-apart leg members 22, 23, joined by a web portion 25 to define therewith a channel-shaped member. In the example, the connector insert element 20 is fabricated from a standard 3/4×3/4×3/4-inch channel having a 1/8-inch wall. One end of the connector element 20 is fixedly attached to the outer periphery of the tubular member T, welding being considered as a satisfactory attaching means because of economies realized thereby, security of the attachment and other considerations. In most instances, the connector element 20 will form a right angle with the tubular member T to which it is attached, although other angles can be used depending upon the result to be accomplished.

Figure 3:
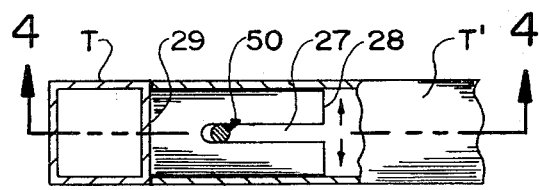
FIG. 3 is a fragmentary, sectional view of the assembled fastening means of FIG. 1, taken from the lines 3—3 of FIG. 4.

A weakening means permits spreading of the leg members 22, 23 apart from each other and includes a longitudinally extending slot 27 extending through the outer edge 28 of said web portion 25 and terminating short of the inner edge 29 thereof. Satisfactory results have been obtained by using a connector element 20 having a longitudinal dimension of approximately 2 inches with the slot 27 extending approximately 1 inch or more therein. The previously mentioned weakening means, formed by the slot 27, allows the leg members 22, 23 to spread apart as indicated by the arrows in FIG. 3 when a spreading element is inserted at any point therein, but preferably adjacent to the inner limit thereof. The spreading element can be any form of tapered object that will cause the leg members 22, 23 to spread apart when inserted therebetween; however, a self-tapping fastener element such as a self-tapping screw has proven satisfactory in the example. By providing the self-tapping screw with a slot in the head portion thereof adapted to receive the edge of a coin of small denomination, the need for hand tools during field assembly of the unit is avoided. Anyone having a small coin or other similarly shaped object can tighten the fastener element into spreading, locking relationship, thereby completing the unit's assembly.

An important aspect of the present invention resides in the fact that positioning of the spreading element longitudinally of the slot 27 for suitable spreading of the legs 22, 23 is not critical so long as the spreading element is substantially adjacent to the terminating limit of said slot 27.

The other tubular member T', to be connected to the tubular member T, is provided with a locking means 40, which locking means includes a curved surface 42 defining an opening 41 through the wall of said tubular member T'. The opening 41 is positioned in the tubular member T' so that it overlays the longitudinally extending slot 27 when said tubular member T' is telescopically positioned over the connector element 20. It is to be noted that longitudinal positioning of the opening 41 is not critical so long as it overlays said slot 27 at a point substantially adjacent to the terminal limit thereof.

Figure 5:
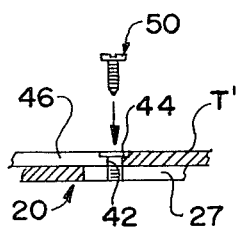
FIG. 5 is a detail of the locking means portion of the fastening means illustrated in FIG. 1, showing the parts assembled.
Figure 6:
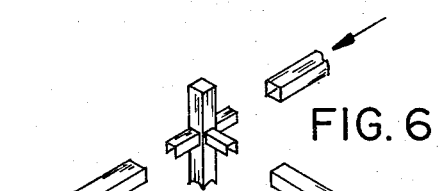
FIGS. 6-8 illustrate schematically an exploded view of the fastening means in accordance with the present invention as used for a three connector center support, a two-connector center support and a two-connector corner support, respectively.
Figure 7:
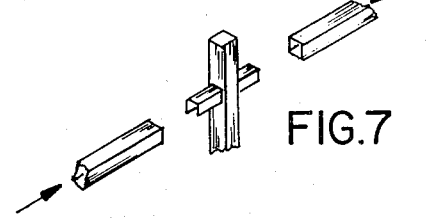
Figure 8:
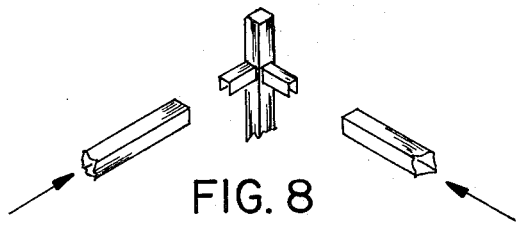

With the tubular member T' in place as described hereinabove, the spreading element may now be inserted through the opening 41 and into spreading engagement with the connector insert element 20. The spreading element, which in the example is a self-tapping screw, acts also as a locking element by interlocking with the opening 41 in the tubular member T'. In the example, a longitudinally extending slot 46 is provided in the tubular member T' (FIG. 1), which slot 46 extends from the outer edge of said member T' to and connects with the opening 41. With the slot 46 in the tubular member T', the spreading-locking element 50, such as the self-tapping screw, may be pre-started into the slot 27 during factory fabrication of the assembly. As a result, field-assembly of the knock-down joint is a simple process of telescopically sliding the tubular member T' into position over the connector element 20 (see FIG. 1) and tightening the spreading-locking element 50 to spread the leg members 22, 23 into frictional contact along substantially the longitudinal axis thereof with the inner walls of the tubular member T' and to effect interlocking engagement with the locking means 40 (see FIG. 5).

Figure 4:
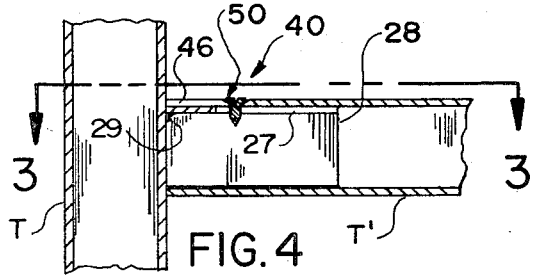
FIG. 4 is a sectional view taken along the lines 4—4 of FIG. 3.

While an opening 41 through the wall of the tubular member T' will generally suffice as the locking means 40 (FIG. 2), when the slot 46 is provided (FIG. 1), the opening 41 must be altered slightly to insure interlocking engagement with the spreading-locking element 50. This objective is accomplished very easily in a number of ways. One way is to cause the upper margin of the curved surface 42 forming the opening 41 to be beveled downwardly, forming, thereby, a countersunk opening (FIG. 4). A spreading-locking element 50 having a correspondingly tapered head will interlock with the countersunk opening and provide satisfactory locking engagement of the joint. In the example, however, an annular-depression forming lip 44 is stamped into the outer wall of the tubular member T' so as to be concentric with the opening 41 (see FIG. 5). The same result can be accomplished, however, by counterboring the opening 41, thereby, forming an indent to interlock with the head portion of a fastener element such as a flat head screw, see FIG. 5 for example. The embodiment having the annular-depression forming lip 44 has the advantage of eliminating at least one step in the manufacturing process because the lip 44 can be die stamped into the member T' at the same time the slot 46 and opening 41 are punched therein. Therefore, using either approach, the spreading-locking element 50 interlocks with the locking means 40 while at the same time causing spreading-frictional engagement of the leg members 22, 23 with the inner walls of the tubular member T' thereby, securely fastening the knock-down joint into connected relationship.

While a preferred embodiment of the invention has been specifically shown and described, this was for purposes of illustration only, and not for purposes of limitation, the scope of the invention being in accordance with the following claims.

That which is claimed is:

1. Fastening means for connecting at least two tubular members, forming, thereby, a knock-down, furniture-support construction, said fastening means comprising:
   a. a connector insert element attached to one of said tubular members and adapted for axial insertion into said other tubular member, said connector insert element including:
      i. a pair of parallel, spaced-apart wall members,
      ii. a web portion connecting said spaced-apart wall members and defining therewith a channel, said web portion having a weakening means including a longitudinally extending slot of uniform width therein, said slot extending through the outer edge of said web portion and terminating short of the inner edge thereof;
   b. a locking means associated with said other tubular member; and
   c. a spreading-locking element inserted into the longitudinally extending slot of said weakening means, adjacent the inner limit thereof, to spread said walls away from each other and into frictional contact along substantially the longitudinal axis thereof with the inner surface of said other tubular member and to make interlocking engagement with said locking means associated with the other tubular member.

2. Apparatus of claim 1, wherein the locking means includes a curved surface defining an opening through the wall of said other tubular member, which opening is adapted to overlay said longitudinally extending slot at a point substantially adjacent to the inner limit thereof when said connector element is axially inserted into said other tubular member.

3. Apparatus of claim 2, wherein the spreading-locking element is a self-tapping screw.

4. Apparatus of claim 3, wherein the curved surface is beveled downwardly to form a countersunk opening and the corresponding surface of said self-tapping fastener element is beveled upwardly for interlocking engagement with said countersunk opening.

5. Apparatus of claim 4, wherein the other tubular member has a longitudinally extending slot extending inwardly from the outer edge thereof to and connecting with said countersunk opening.

6. Apparatus of claim 2, wherein the other tubular member has:
   a. an annular-depression-forming lip in the surface thereof, concentric with said opening and forms said locking means therewith; and
   b. a longitudinally extending slot extending inwardly from the outer edge thereof to and connecting with said opening.

* * * * *